(12) United States Patent
Ostling et al.

(10) Patent No.: US 11,524,340 B2
(45) Date of Patent: Dec. 13, 2022

(54) TOOL BODY INCLUDING A DAMPING APPARATUS AND A MACHINING TOOL HAVING SUCH A TOOL BODY

(71) Applicant: SANDVIK INTELLECTUAL PROPERTY AB, Sandviken (SE)

(72) Inventors: Dan Ostling, Trondheim (NO); Tormod Jensen, Ranheim (NO)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 127 days.

(21) Appl. No.: 16/652,844

(22) PCT Filed: Sep. 11, 2018

(86) PCT No.: PCT/EP2018/074471
§ 371 (c)(1),
(2) Date: Apr. 1, 2020

(87) PCT Pub. No.: WO2019/068433
PCT Pub. Date: Apr. 11, 2019

(65) Prior Publication Data
US 2020/0246879 A1    Aug. 6, 2020

(30) Foreign Application Priority Data
Oct. 2, 2017 (EP) ..................................... 17194418

(51) Int. Cl.
*B23B 29/02* (2006.01)
*B23Q 11/00* (2006.01)

(52) U.S. Cl.
CPC ........ *B23B 29/022* (2013.01); *B23Q 11/0035* (2013.01); *B23B 2250/16* (2013.01)

(58) Field of Classification Search
CPC . B23B 29/022; B23B 2250/16; B23B 27/002; B23Q 11/0035; F16F 15/1428; B23C 2250/16
See application file for complete search history.

(56) References Cited

U.S. PATENT DOCUMENTS 3,690,414 A * 9/1972 Aggarwal .......... B23Q 11/0032
188/378
4,553,884 A    11/1985 Fitzgerald et al.
(Continued)

FOREIGN PATENT DOCUMENTS

CA     2483844 A1 * 11/2003 ........... B23B 29/022
CN     1390666 A      1/2003
(Continued)

*Primary Examiner* — Eric A. Gates
*Assistant Examiner* — Paul M Janeski
(74) *Attorney, Agent, or Firm* — Corinne R. Gorski

(57) ABSTRACT

A tool body includes a damping apparatus for damping vibrations in a machining tool having, besides the tool body, a member with at least one cutting edge to be secured to the tool body. The damping apparatus is arranged in an internal room of the tool body and includes a damper mass body with an axial bore and a central tube extending through the bore and which is rigidly secured to the damper mass body inside the through bore. A central tube is also at both ends thereof rigidly connected to a tool body fixed part and the central tube is made of a material with a spring property allowing the damper mass body to oscillate in the internal room perpendicularly to the longitudinal extension of the central tube.

14 Claims, 2 Drawing Sheets

(56) References Cited

U.S. PATENT DOCUMENTS

| | | | | |
|---|---|---|---|---|
| 9,027,720 B2* | 5/2015 | Ogata | ............... | B23B 27/007 |
| | | | | 188/381 |
| 2015/0231706 A1* | 8/2015 | Frank | ............... | B23B 27/002 |
| | | | | 407/32 |
| 2015/0375305 A1* | 12/2015 | Frota de Souza Filho | ............... | |
| | | | | B23B 29/022 |
| | | | | 408/143 |
| 2016/0067787 A1* | 3/2016 | Giannetti | ............... | G01M 1/02 |
| | | | | 29/407.01 |
| 2016/0311031 A1 | 10/2016 | Giannetti | | |
| 2018/0281074 A1* | 10/2018 | Eichelberger | ............... | B23B 27/002 |

FOREIGN PATENT DOCUMENTS

| | | |
|---|---|---|
| CN | 1665629 A | 9/2005 |
| CN | 101267905 A | 9/2008 |
| CN | 201115881 Y | 9/2008 |
| CN | 201128003 Y | 10/2008 |
| CN | 101526122 A | 9/2009 |
| CN | 206190792 U | 5/2017 |
| EP | 1407846 A1 | 4/2004 |
| EP | 2890915 A1 | 7/2015 |
| JP | H06031507 A | 2/1994 |
| WO | 92/14947 A1 | 9/1992 |

* cited by examiner

TOOL BODY INCLUDING A DAMPING APPARATUS AND A MACHINING TOOL HAVING SUCH A TOOL BODY

RELATED APPLICATION DATA

This application is a § 371 National Stage Application of PCT International Application No. PCT/EP2018/074471 filed Sep. 11, 2018 claiming priority to EP 17194418.4 filed Oct. 2, 2017.

TECHNICAL FIELD OF THE INVENTION

The present invention relates to a tool body including a damping apparatus for damping vibrations in a machining tool according to the preamble of claim 1 as well as a machining tool having such a tool body.

The invention is not restricted to tool bodies and machining tools for any particular type of machining, and the tool body may for instance have members with cutting edges secured thereto in the form of cutting inserts for chip-removing machining of a work piece by turning, milling, drilling, or boring. Thus, the tool body may be designed to receive a cutting head including cutting edges or seats for cutting inserts. Both rotating and non-rotating machining tools are comprised. Neither is the invention restricted to any size of such machining tools, but these may for instance have a diameter of 500 millimetres and a length of 6 metres or be as small as having a diameter of only 10 millimetres.

The tool body is provided with such a damping apparatus for damping radial and tangential forces applied on the tool body by the machining action and by that improving the accuracy of the machining operation and prolonging the lifetime of cutting edges of the machining tool. The damping effect of such a damping apparatus is a result of an interaction between the damper mass body, which is of a high density material such as lead, and the machining tool member provided with a cutting edge through any type of resilient element.

The frequency by which the damper mass body will swing upon machining will depend upon the mass of the damper mass body and the spring constant of said resilient element. This frequency will increase with an increasing said spring constant and decrease with an increasing mass of the damper mass body. The frequency needed for appropriate damping of self-induced vibrations in a machining tool will depend upon the design of the machining tool, such as the ratio of the length/diameter of the tool body, and weight distribution of the machining tool.

BACKGROUND ART

A tool body of the type defined in the introduction is known through WO 92/14947 and the resilient element of the damping apparatus of that tool body is provided by elastomer rings surrounding the central tube, which is secured to the damper mass body and moves with this as being an integral part therewith. These elastomer rings are rather soft, which results in a low spring constant and a low damping frequency for a given mass of a damper mass body restricting the range of possible shapes and dimensions of tool bodies and machining tools for which appropriate damping may be obtained. Furthermore, the elastomer material may not withstand the high temperatures which may occur during certain machining operations desired, so that excessive cooling will be required or the efficiency of the machining operation has to be lowered for keeping the temperature down. The properties of such elastomer material will also change over time due to aging.

SUMMARY OF THE INVENTION

The object of the present invention is to provide a tool body of the type defined in the introduction being improved in at least some aspect with the respect to such tool bodies already known.

This object is according to the invention obtained by providing such a tool body with the features listed in the characterizing part of appended claim 1. Thus, by rigidly connecting the central tube at both ends thereof to a tool body fixed part and making the central tube of a material with a spring property allowing the damper mass body to oscillate in the internal room perpendicularly to the longitudinal extension of the central tube said resilient element will be provided by the central tube without any elastomer rings needed therefor. By using the central tube as resilient element substantially higher temperatures may be allowed and the problems with ageing of the elastomer material will be avoided. The term tool body fixed part is to be understood as part of the tool body which is to be rigid or stiff with respect to a said member 3 with at least one cutting edge to be secured to the tool body, such as for example parts of the tool body casing or parts rigidly secured thereto.

Furthermore, the spring constant of the resilient element in the form of the central tube may be varied within a wide range by the choice of diameter and wall thickness of the central tube.

This means that substantially higher damping frequencies than by elastomer rings may be obtained when desired. But it is pointed out that low damping frequencies are still possible to obtain by embodiments of the invention.

According to an embodiment of the invention the central tube is made of steel or carbon fibre. These are suitable materials with spring properties for obtaining spring constants of desired magnitudes.

According to an embodiment of the invention the central tube is a machining tool cooling tube, which may transport any coolant to a member carrying out chip-removing machining of a said machining tool, for example a coolant liquid such as water or a gas mixture as air.

According to an embodiment of the invention the through bore has at at least one end thereof a length portion with larger cross-section dimensions than the central tube leaving a space between the damper mass body and the central tube, and an element is arranged to bridge this space between the central tube and the damper mass body at a location along the central tube. The arrangement of such an element supporting the central tube with respect to the damper mass body will influence the spring constant of the damper apparatus. The choice of the location of this bridging element will then also influence the magnitude of the spring constant and accordingly be used to obtain the spring constant desired.

According to an embodiment of the invention said element is rigid, and according to other embodiments of the invention this element has elastic properties and it may be in the form of an O-ring of rubber. The choice of the material of this bridging element will also influence the magnitude of the spring constant.

According to an embodiment of the invention said element is movable along the central tube between different said locations so as to change the spring constant of the central tube. It is then especially advantageous if the through bore has a said length portion and a said element at both ends of the through bore. A frequency tuning can then be implemented by these movable elements, and the spring constant may be adjusted for one and the same damping apparatus, so that this may be used for machining tools with different lengths by allowing the spring constant to be adjusted to be appropriate for each such length.

According to an embodiment of the invention the damper mass body has a circular cylindrical shape with the through bore extending according to the centre axis of the cylinder so formed. This results in a uniform damping of the vibrations of a machining tool in operation.

According to an embodiment of the invention the internal room of the tool body contains a damping fluid, such as oil, in an annular cavity separating the damper mass body radially from internal walls defining the internal room. Such a damping fluid improves the damping action of the damping apparatus.

The invention also relates to a machining tool having a tool body according to the invention and a use of such a tool body to damp vibrations in a machining tool in operation.

Other advantageous features as well as advantages of the present invention appear from the description following below.

BRIEF DESCRIPTION OF THE DRAWINGS

With reference to the appended drawings, below follows a specific description of embodiments of the invention cited as examples.

In the drawings.

DETAILED DESCRIPTION OF EMBODIMENTS OF THE INVENTION

Figure 1:
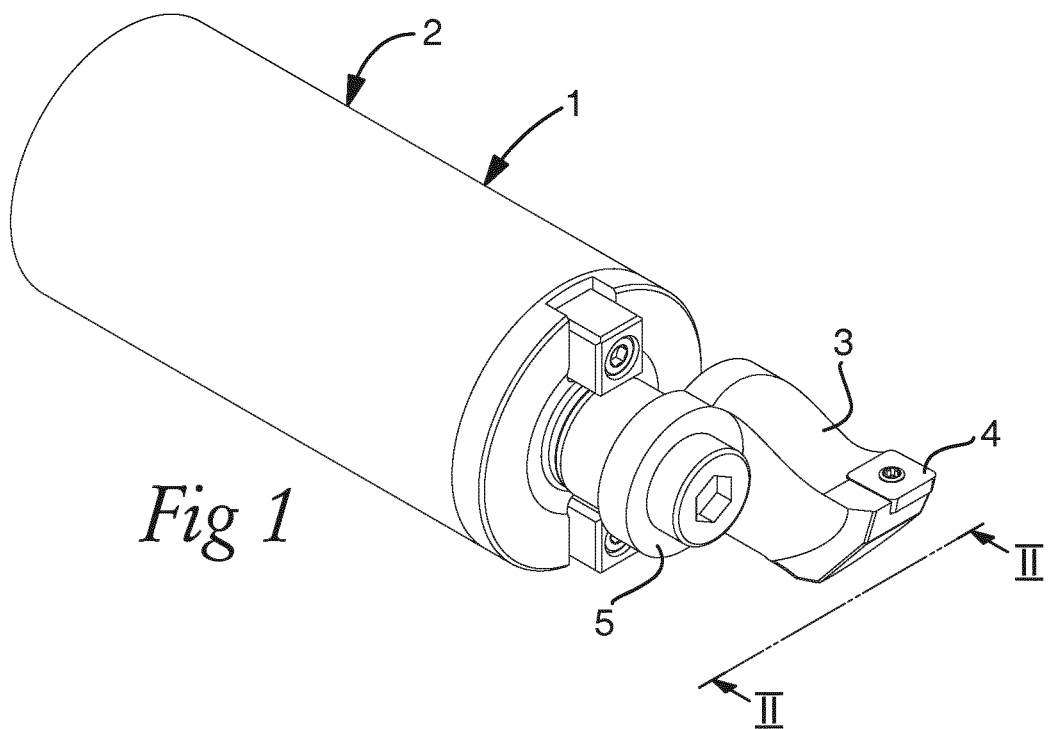
FIG. 1 is a perspective view of a machining tool including a tool body according to the present invention with a damping apparatus for damping vibrations in the machining tool and a member with a cutting insert.
Figure 2:
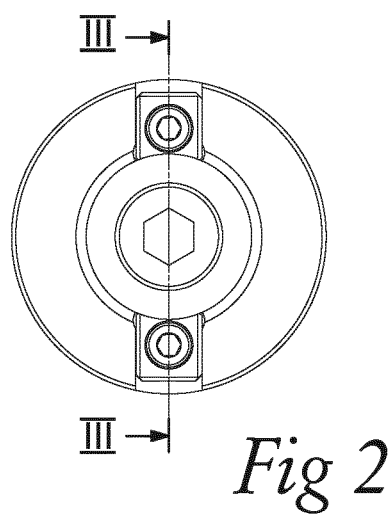
FIG. 2 is a view in the direction of the arrow II in FIG. 1 of the tool body shown in FIG. 1 without the member with a cutting insert.

FIG. 1 illustrates a machining tool 1 for turning having besides a tool body 2 according to an embodiment of the invention a member 3 with a cutting insert 4 for chip-removing machining in the form of turning secured at an end 5 of the tool body. The tool body may just as well be used in a machining tool for other types of machining, such as milling, drilling, or boring, and a corresponding member with at least one cutting edge for chip-removing machining is then to be secured to the end 5 of the tool body.

The tool body includes a damping apparatus 6 for damping vibrations in the machining tool caused by machining operation, and this damping apparatus is arranged in an internal room 7 (see FIG. 3) of the tool body defined by a casing 8. The damping apparatus comprises a damper mass body 9 with a circular cylindrical shape of a high density material, such as of lead, with an axial through bore 10. The internal room 7 contains a damping fluid, such as oil, in an annular cavity 22 separating the damper mass body 9 radially from internal walls of the casing 8 defining the internal room. A central tube 11 extends through the through bore 10 and is rigidly secured to the damper mass body 9 inside the through bore. The central tube 11 is at both ends 12, 13 thereof rigidly connected to a tool body fixed part 14, 15, i.e. a part of the tool body which is to be rigid or stiff with respect to a said member 3 with at least one cutting edge to be secured to the tool body, in this case end pieces. The central tube 11 is made of a material with a spring property, such as steel or carbon fibre with this property, allowing the damper mass body 9 to oscillate in the internal room 7 of the tool body perpendicularly to the longitudinal extension of the central tube 11. The damping frequency of the damping apparatus will be proportional to the square root of k/m, in which k is the spring constant of the spring formed by the central tube with a spring property and m is the mass of the damper mass body 9. The spring constant will depend upon the diameter and the wall thickness of the central tube as well as the material chosen for that tube, so that said frequency may be selected to match the frequency of the vibrations to be damped by appropriately choosing these characteristics of the central tube. Embodiments of the invention will by this without any problem allow to obtain such a frequency in the range of 300 Hz to 1 100 Hz, and frequencies outside this range are also conceivable.

The through bore 10 of the damper mass body 9 has at each end thereof a length portion 16, 17 with larger cross section dimensions than the central tube leaving a space 18, 19 between the damper mass boy 9 and the central tube 11. The choice of length of these length portions will also influence the spring constant of the central tube 11.

Figure 3:
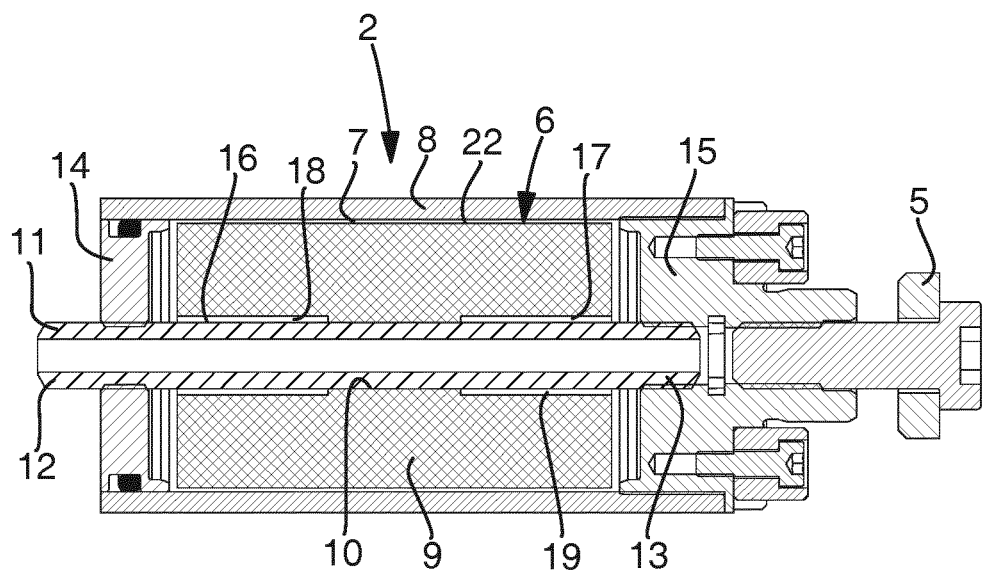
FIG. 3 is a cross section view according to III-Ill in FIG. 2 of a tool body according to FIG. 1.
Figure 4:
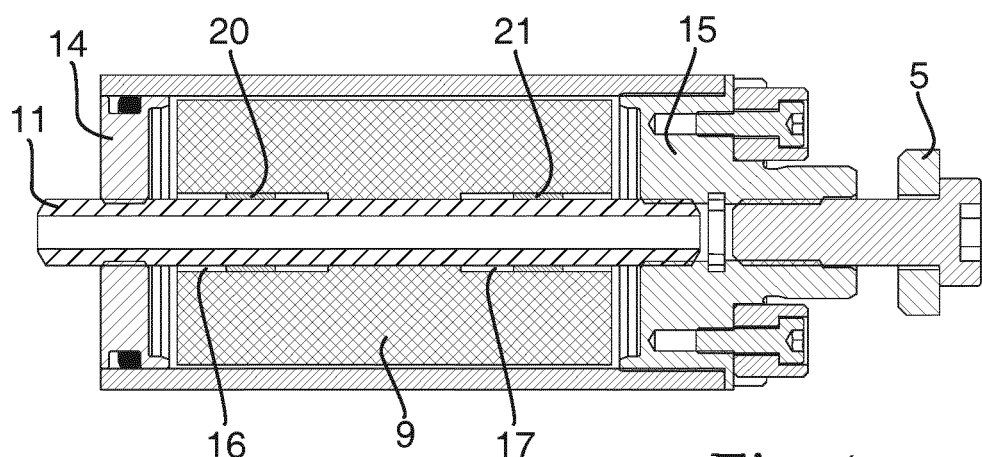
FIG. 4 is a view similar to that of FIG. 3 of a tool body according to a second embodiment of the invention.

FIG. 4 is a view similar to FIG. 3 of a tool body according to a second embodiment of the invention differing from that shown in FIG. 3 by an arrangement of an element 20, 21 bridging the respective space 18, 19 between the damper mass body 9 and the central tube 11. These elements 20, 21 will form a support of the central tube 11 with respect to the damper mass body and will influence the spring property of the central tube 11. The elements 20, 21 may be chosen to be rigid or to have elastic properties, such as being O-rings surrounding the central tube 11. The properties chosen for these elements 20, 21 will also influence the magnitude of the spring constant of the central tube 11. Furthermore, the elements 20, 21 are preferably movable along the central tube between different locations so as to change the spring constant of the central tube. This makes it possible to use the same tool body or identical tool bodies for obtaining appropriate damping of vibrations in machining tools of different types and/or dimensions generating vibrations of different frequencies by the machining operation thereof.

The invention is of course not restricted to the embodiments thereof described above, but many possibilities to modifications thereof would be apparent to a person with skill in the art without departing from the scope of the invention as defines in the appended claims.

The length portions with larger cross-sections dimensions of the through bore of the damper mass body may have other lengths than shown in the figures or not be there at all. It is of course also possible to have the elements bridging the space between the central tube and the damper mass body immovably arranged or only one of them movable or having only one such element.

The invention claimed is:

1. A tool body including a damping apparatus for damping vibrations in a machining tool having besides the tool body a member with at least one cutting edge to be secured to the tool body, wherein the damping apparatus is arranged in an internal room of the tool body and comprises:

a damper mass body with an axial through bore; and a central tube extending through said bore, the central bore being rigidly secured to the damper mass body inside the through bore, wherein the central tube is at both ends thereof rigidly connected to a tool body fixed part and the central tube is made of a material with a spring property allowing the damper mass body to oscillate in the internal room perpendicularly to the longitudinal extension of the central tube.

2. The tool body according to claim 1, wherein the central tube is made of steel or carbon fibre.

3. The tool body according to claim 1, wherein the through bore has at at least one end thereof a length portion with larger cross-section dimensions than the central tube leaving a space between the damper mass body and the central tube, and wherein an element is arranged to bridge the space between the central tube and the damper mass body at a location along the central tube.

4. The tool body according to claim 3, wherein said element is rigid.

5. The tool body according to claim 3, wherein said element has elastic properties.

6. The tool body according to claim 5, wherein said element is an O-ring made of rubber.

7. The tool body according to claim 3, wherein said element is movable along the central tube between different locations so as to change a spring constant of the central tube.

8. The tool body according to claim 3, wherein the through bore has a length portion and said element is located at both ends of the through bore.

9. The tool body according to claim 1, wherein the central tube is a machining tool cooling tube.

10. The tool body according to claim 1, wherein the damper mass body has a circular cylindrical shape with the through bore extending along a center axis thereof.

11. The tool body according to claim 1, wherein the internal room contains a damping fluid in an annular cavity separating the damper mass body radially from internal walls defining the internal room.

12. The tool body according to claim 11, wherein the damping fluid is oil.

13. A machining tool comprising a tool body according to claim 1.

14. Use of a tool body according to claim 1 to damp vibrations in a machining tool in operation.

* * * * *